May 8, 1951 R. H. CARSON 2,552,148

TAPE SPLICER

Filed Aug. 16, 1949

INVENTOR.
ROBERT H. CARSON

BY Herman L. Gordon

ATTORNEY

Patented May 8, 1951

2,552,148

UNITED STATES PATENT OFFICE 2,552,148

TAPE SPLICER

Robert H. Carson, Washington, D. C.

Application August 16, 1949, Serial No. 110,650

6 Claims. (Cl. 154—42.3)

This invention relates to tape splicing implements, and more particularly to devices for use in splicing magnetic recording tape.

A main object of the invention is to provide a novel and improved tape splicing implement which is very simple in construction, easy to manipulate, and which provides a substantially noiseless joint in a magnetic recording tape.

A further object of the invention is to provide an improved tape splicer for joining ends of a magnetic recording tape, said splicer being inexpensive to manufacture, involving only a few parts, and being very compact in size, whereby it may be readily incorporated in tape recording equipment, as well as being marketable as a separate and individual unit.

A still further object of the invention is to provide an improved splicing device for connecting the severed ends of a tape of any type, the device insuring accurate longitudinal alignment of the tape segments, providing accurate abutment of the joining ends of said tape segments, and providing a mechanically secure and durable joint between the segments.

Further objects and advantages of the invention will become apparent from the following description and claims, and from the accompanying drawings, wherein:

Figure 1:
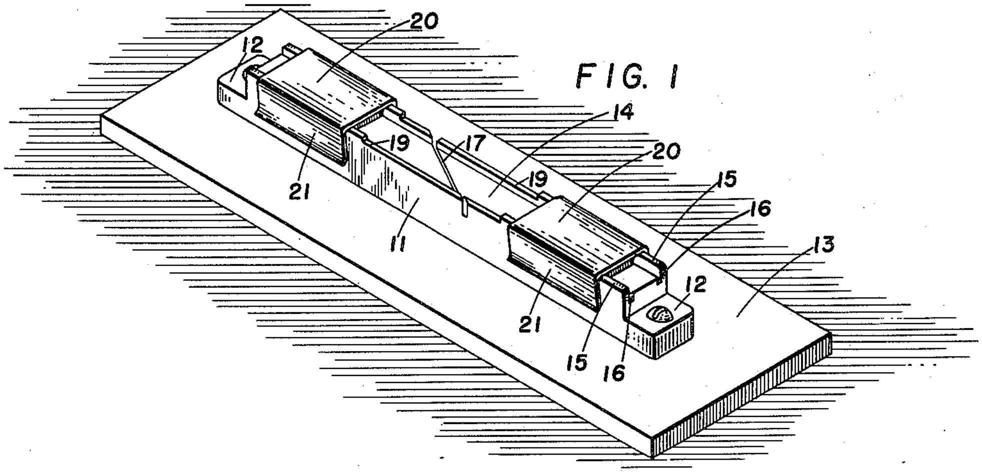
Figure 1 is a perspective view of a tape splicing implement constructed in accordance with the present invention, shown mounted on a supporting plate.
Figure 2:
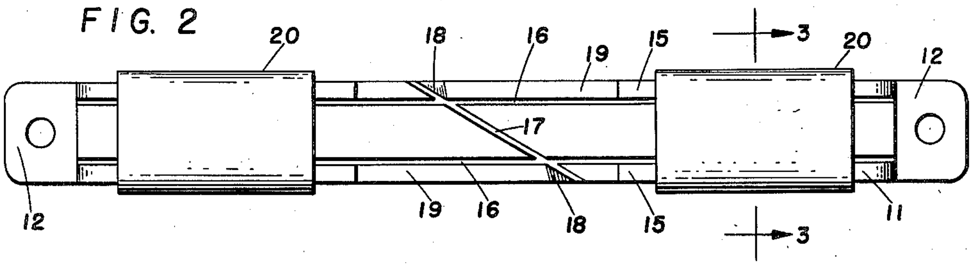
Figure 2 is a top plan view of the tape splicing implement of Figure 1.
Figure 3:
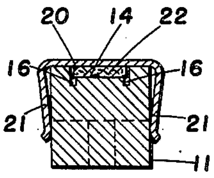
Figure 3 is a vertical transverse cross-sectional view taken on line 3—3 of Figure 2.

Referring to the drawings, and more particularly to Figures 1 to 3, the body of the implement is designated generally at 11 and comprises an elongated bar formed at its ends with apertured tabs 12, 12 for securing the body 11 to a suitable support, as for example, to a supporting plate 13, as shown in Figure 1. The top surface of the body 11 is formed with a longitudinal groove 14 corresponding in width with the width of the tape with which the splicing implement is to be used, and therefore defining a seat for receiving the severed ends of the tape, as will be subsequently described. As shown in Figures 1, 2, 3 and 5, the groove 14 defines upstanding guide wall portions 15, 15 at the respective sides of the body 11. At each side margin of the groove 14 the body 11 is formed with a narrow longitudinal additional groove 16, the narrow grooves 16, 16 being disposed inwardly adjacent the respective guide wall portions 15, 15. The top surface of the body 11 is formed at its intermediate portion with a straight diagonal narrow groove 17 of substantially the same depth as the narrow side grooves 16, 16, which extends completely across the width of the body 11, including the guide wall portions 15, 15. The guide wall portions 15, 15 may be bevelled slightly adjacent the diagonal groove 17, as shown at 18, 18, to facilitate the entry of a cutting blade into the groove 17 at said guide wall portions, as will be subsequently explained. The height of the guide wall portions 15, 15 may be reduced adjacent the diagonal groove 17 by cutting shallow notches 19 in the top edges of the guide wall portions, said shallow notches being of substantial length and being transversely aligned with each other. As shown in Figure 2, the diagonal groove 17 is located well within the rectangle defined by the ends of the shallow notches 19, 19.

Designated at 20, 20 are respective channel-shaped clips of resilient material having the resilient spring arms 21, 21 adapted to frictionally grip the sides of the body 11 to hold the clips engaged over said body in the manner illustrated in Figure 1. Secured to the underside of the top wall of each clip 20 is a longitudinally extending pad 22 of deformable resilient material, such as cork, rubber, felt, or the like, said pad being slightly less in width than the width of groove 14, and being adapted to enter the groove 14 when the clip is clamped over the body 11, in the manner shown in Figure 3.

Figure 6:
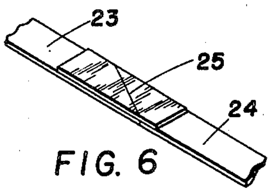
Figure 6 is a perspective view showing a tape splice formed by the use of the splicing implement of the present invention.

In splicing together the torn ends of a tape, such as the torn ends of a magnetic recording tape, the clips 20, 20 are first removed and the torn tape segments are placed in the groove 14 from opposite ends of the body 11 with the segments overlapping, the torn ends of the segments extending a substantial distance beyond the diagonal groove 17 on opposite sides thereof. The clips 20, 20 are then engaged over the body 11 approximately in the positions shown in Figures 1 and 2, whereby the pads 22 clamp the respective tape segments against the bottom surface of groove 14 and hold the segments stationary. The operator then trims the segments by passing the edge of a sharp blade, such as a razor blade or a knife, through the diagonal groove 17, thereby forming diagonally abuting end edges on the tape segments. The detached portion of the upper tape segment is then removed and a piece of flexible adhesive tape, such as adhesive cellophane tape is laid transversely across the abutting end portions of the tape segments in the space defined by the end shoulders of the shallow notches 19. The edge of the razor blade, or other sharp blade, is then passed longitudinally through the respective narrow grooves 16, 16, severing the portions of the adhesive tape not in contact with the abutting tape segments, so that the abutting tape segments are joined together by a section of adhesive tape which is equal in width to that of the abutting tape segments. The resultant splice is shown in Figure 6, wherein the abutting tape segments are shown respectively at 23 and 24, and the section of adhesive tape connecting said abutting tape segments is shown at 25.

After the splice has been made, as above described, the clips 20 are removed, and the tape is ready for use.

A diagonal splice is employed rather than a transverse splice, since it has been found that a transverse splice in a magnetic tape produces a click in audio reproduction due to the sharp discontinuity in the magnetization pattern occurring at a transverse joint. When a diagonal splice is employed, the discontinuity occupies a relatively small part of the magnetic track energizing the playback head during the period that the splice is moving past the head. Therefore, the diagonal splice minimizes the noise in reproduction heretofore produced by transverse joinder of tape segments.

Figure 5:
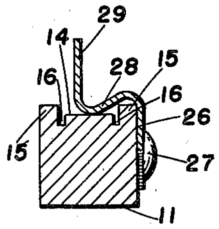
Figure 5 is a vertical transverse cross-sectional view taken on line 5—5 of Figure 4.
Figure 4:
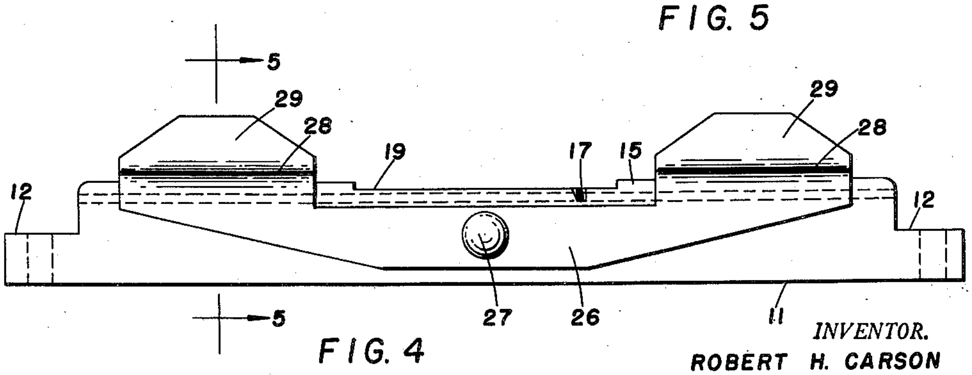
Figure 4 is a side elevational view illustrating a modified form of tape splicing implement constructed in accordance with the present invention.

In the embodiment of the invention illustrated in Figures 4 and 5, the same body member 11 is employed as in Figures 1 to 3, but a different tape clamping means is employed. In Figures 4 and 5 the tape clamping means comprises an elongated resilient spring member 26 pivotally secured to one side of the body member 11 at the midportion of said body member, as by a rivet 27. Each end of the spring member 26 is formed with an inwardly extending resilient top arm 28 which extends a substantial distance transversely over and across the groove 14 and normally bears on the bottom surface of said groove with spring pressure. The spring arms 28 are of substantial longitudinal length and are located adjacent the respective ends of the body member 11. Each spring arm 28 terminates in an upstanding finger tab portion 29 which is employed for flexing the arm 28 outwardly, as will be presently explained.

In splicing together the torn ends of a tape, the segments are overlapped and moved laterally into the groove 14 from the side of body member 11 opposite rivet 27, the respective tape segments being clampingly received beneath the respective spring arms 28 and held by said spring arms in splicing position in groove 14. As in the use of the embodiment of Figure 1, the torn ends of the segments extend substantial distances beyond the diagonal groove 17 on opposite sides of said groove. The operator then trims the segments by passing the edge of a sharp blade through the diagonal groove, thereby forming the diagonally abutting end edges on the segments. The severed portion of the upper overlapping tape segment is then discarded and a piece of flexible adhesive tape is laid across the abutting end portions of the tape segments in the space defined between the shouldered ends of shallow notches 19. The edge of the razor blade, or other sharp blade, is then passed longitudinally through the narrow grooves 16, 16, trimming the adhesive tape to the same width as the abutting tape segments, in the manner previously described. One of the spring arms 28 is then flexed outwardly by means of the finger tab 29 thereof, whereby said one spring arm may clear the guide wall member 15 subadjacent thereto, and the outwardly flexed spring arm is then moved downwardly along the side surface of body member 11, causing member 26 to pivot around rivet 27. This lifts the opposite spring arm 28 and frees the spliced tape for removal.

For example, in Figure 5, to release the spliced tape, the finger tab 29 is moved to the right until said finger tab clears the right hand guide wall element 15, the member 26 flexing to the right to allow this movement. The arm 28 is then moved downwardly, causing the member 26 to rotate counter-clockwise, as viewed in Figure 4, and causing the right hand spring arm 28 of Figure 4 to be lifted.

The length of the shallow grooves 19 may be made such as to receive a standard width of adhesive tape, thereby acting to positively position the adhesive tape on the diagonally abutting tape end portions to be spliced.

If so desired, the shallow grooves 19 may be omitted and the adhesive tape may be visually located with respect to the diagonally abutting tape segments in making a splice.

While certain specific embodiments of tape splicing implements have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a tape splicing implement of the character described, a body member formed with an elongated main groove of substantial width, said body member being formed with a first straight relatively deep and narrow groove crossing said main groove and being formed with additional relatively deep and narrow longitudinal grooves inwardly adjacent the respective side walls of the main groove and intersecting the first narrow groove.

2. In a tape splicing implement of the character described, a body member formed with an elongated relatively wide main groove, said body member being formed with a first straight relatively deep and narrow groove diagonally crossing said main groove and being formed with additional relatively deep and narrow longitudinal grooves inwardly adjacent the respective side walls of the main groove and intersecting the first narrow groove.

3. A tape splicing implement of the character described, comprising a body member formed with an elongated relatively wide main groove, said body member being formed with a first relatively deep and narrow groove crossing said main groove and being formed with additional relatively deep and narrow grooves inwardly adjacent the respective side walls of the main groove and intersecting the first narrow groove, and respective clamping members carried by said body member on opposite sides of the first narrow groove, each clamping member being provided with a resilient element engaging in said main groove.

4. In a tape splicing implement of the character described, a body member formed with an elongated relatively wide main groove, said body member being formed with a first straight relatively deep and narrow groove crossing said main groove and being formed with additional relatively deep and narrow grooves inwardly adjacent the respective side walls of the main groove and intersecting the first narrow groove, the side portions of the body member adjacent the main groove being reduced in height in the region of the first narrow groove.

5. A tape splicing implement of the character described, comprising a body member formed with an elongated relatively wide main groove, said body member being formed with a first relatively deep and narrow groove crossing said main groove and being formed with additional relatively deep and narrow grooves inwardly adjacent the respective side walls of the main groove and intersecting the first narrow groove, an arm pivotally secured to said body member for rotation around a transverse axis, and respective clamping elements carried by the arm and engaging in the main groove on opposite sides of the first narrow groove.

6. A tape splicing implement of the character described, comprising a body member formed with an elongated relatively wide main groove, said body member being formed with a first relatively deep and narrow groove crossing said main groove and being formed with additional relatively deep and narrow grooves inwardly adjacent the respective side walls of the main groove and intersecting the first narrow groove, a laterally flexible arm pivotally secured to a side of the body member for rotation around an axis transverse with respect to the main groove, and respective spring clamping elements carried by the ends of the arm and engaging in the main groove on opposite sides of the first narrow groove.

ROBERT H. CARSON.

REFERENCES CITED

The following references are of record in the file of this patent:

UNITED STATES PATENTS

| Number | Name | Date |
|---|---|---|
| 469,159 | Maroske | Feb. 16, 1892 |
| 731,919 | Larson | June 23, 1903 |